US005896459A

United States Patent [19]

Williams, Jr.

[11] Patent Number: 5,896,459

[45] Date of Patent: Apr. 20, 1999

[54] AUDIO MIXER

[75] Inventor: Norman F. Williams, Jr., Kernersville, N.C.

[73] Assignee: Abaya Technologies, Inc., Jamestown, N.C.

[21] Appl. No.: 08/890,321

[22] Filed: Jul. 9, 1997

Related U.S. Application Data

[60] Provisional application No. 60/021,519, Jul. 10, 1996.

[51] Int. Cl.$^{6}$ .......... H04B 1/00

[52] U.S. Cl. .......... 381/119

[58] Field of Search .......... 381/119, 80, 81, 381/123, 109, 1, 61

[56] References Cited

U.S. PATENT DOCUMENTS

| | | | |
|---|---|---|---|
| 4,479,240 | 10/1984 | McKinley, Jr. | 381/80 |
| 4,524,452 | 6/1985 | Marshak | 381/28 |
| 4,635,288 | 1/1987 | Stadius | 381/119 |
| 5,237,619 | 8/1993 | Frassinetti | 381/119 |
| 5,444,676 | 8/1995 | Balsamo et al. | 369/4 |
| 5,454,041 | 9/1995 | Davis | 381/119 |
| 5,471,539 | 11/1995 | Flum et al. | 381/119 |
| 5,652,797 | 7/1997 | Okamura et al. | 381/61 |
| 5,757,941 | 5/1998 | McMillen | 381/119 |
| 5,774,567 | 6/1998 | Heyl | 381/119 |

*Primary Examiner*—Curtis A. Kuntz
*Assistant Examiner*—Xu Mei
*Attorney, Agent, or Firm*—Rhodes Coats & Bennett, L.L.P

[57] ABSTRACT

An audio mixer has separate dry mix, effects returns mix and main mix mixing buses, each mixing bus having a separate mix output. Multiple audio signals are mixed together without effects processing onto a dry mixing bus. Simultaneously, the original audio signals are also mixed together at various levels onto multiple sends mixing buses which are coupled to an effects sends (or output). The mixed audio signals on each of the sends mixing buses are sent to either internal or external effects processors wherein various effects are added to the mixed signals. The processed signals from the effects processors are fed back into the mixer (if external effects processors are used) through an effects return and further mixed together onto an effects mixing bus. Thus, the effects mix bus includes the sum of the processed mixed signals from the sends mixing buses. The dry mix and the effects mix are subsequently mixed onto a main mixing bus to provide a main mix output.

26 Claims, 4 Drawing Sheets

AUDIO MIXER

This application claims the benefit of U.S. Provisional Application Ser. No. 60/021,519, filed Jul. 10, 1996.

BACKGROUND OF THE INVENTION

The present invention relates generally to audio mixers and, more particularly, to an audio mixer configuration providing separate dry, return effects and main audio mixes. The dry mix is a sum of individual audio signals without effects processing. The effects returns mix is a sum of effects processed audio signals formed from various mixes of the original audio signals. The main mix is the sum of the dry and effects return mixes.

Typical mixer configurations 10, as shown in FIG. 1, include various input channels 12 which are summed or mixed together onto a main mix bus 14. The audio signals from each input channel are also mixed together and sent to one or more effects sends 16. This signal appearing at the various effects sends 16 are processed by various effects processors whose outputs are fed back into the mixer through effects returns 18 and mixed with the audio signals fed directly onto the mixing bus 14 from the individual inputs 12. In such configurations, the effects returns are mixed onto the mixing bus 14 as if they were individual channel input signals.

In today's live performance musical market, most performers and bands do not own their own PA systems. Instead, these performers rely on rental systems or pre-existing clubhouse systems to supply a majority of their PA needs. Because these performers often use different monitor systems on a daily basis, each monitor mix provides a different and often unfamiliar sound. These differences cause inconsistencies in performances and hamper the performer's ability to sing or play in key. Additionally, performers often prefer monitor feedback with less (or at least different) amounts and types of effects than contained in signals sent to the main system speakers providing sound to the audience. A mixer is needed which provides mixing control for the performer's monitor as well as interfacing with the main mixing system of the clubhouse. This system would provide the main system with the dry and effects mixes separately to provide full audio control of the dry mix as well as having access to the effects mix as desired. Preferably, the total mix of the dry and effects mixes is available to the main system as well. Thus, there is a need for a mixer having a configuration which will interface with industry standard effects processing units, provide quick and easy connection to a wide variety of rental and clubhouse PA systems, send a preprocessed effects submix to the main clubhouse mixing system, separate the dry (no effects) and effects mixes, and provide a combined mix to the main clubhouse system.

Currently, a mixer configuration is not available which provides separate dry and effects mixes in conjunction with the main overall mix. In the absence of such a system, performers are faced with using unfamiliar equipment which lacks the flexibility provided by a system having separate dry, effects and main audio mix outputs.

One possible way the Applicant has discovered to overcome the disadvantages discussed above require at least three conventional audio mixers 22, 24 and 26, as shown in FIG. 2. Various audio signals are fed to the individual inputs 12 of mixer 22. The signals are mixed and sent to the effects sends 16 for external effects processing by one or more external effects processors 30. The output of the effects processor 30 is fed into various inputs 12 of mixer 24. The output of mixer 22 is the dry, unprocessed mix which provides a dry output for external use and input to mixer 26. The output of mixer 24 provides the effects mix output for external use as well as mixing with the dry mix through mixer 26. An overall mix of the dry and effects mixes is provided at the main output 20 of mixer 26. To the best of Applicant's knowledge, such a mixer configuration has not been implemented.

Using additional mixers to provide the dry and effects mix outputs add substantial complexity during setup, installation and operation. Such techniques may degrade performance of the sound system due to increased noise levels injected into the system from the additional hardware, such as mixers, cables and connectors required for operation. The additional hardware also increases the capital cost of the system and the operating cost of the system. Furthermore, additional physical space is required for setup of the additional mixers.

Thus, there remains a need for a mixer providing separate dry, effects and main mixes that is compact, easy to operate and efficient to use.

SUMMARY OF THE INVENTION

The present invention is directed to an audio mixer having separate dry mix, effects returns mix and main mix mixing buses wherein each mixing bus provides a separate mix output. Preferably, multiple audio signals are mixed together without effects processing onto a dry mixing bus. Simultaneously, the original audio signals are also mixed together at various levels onto multiple sends mixing buses which are coupled to an effects sends (or output).

The mixed audio signals on each of the sends mixing buses are sent to either internal or external effects processors wherein various effects are added to the mixed signals. The processed signals from the effects processors are fed back into the mixer (if external effects processors are used) through an effects return and further mixed together onto an effects mixing bus. Thus, the effects mix bus includes the sum of the processed mixed signals from the sends mixing buses.

The dry mix and the effects mix are subsequently mixed onto a main mixing bus to provide a main mix output. The present invention provides an easy-to-use integrated system which provides a high-quality dry, effects and main output mix while providing extensive control to the performers and system operators.

Accordingly, one aspect of the present invention is to provide an integrated audio mixer having dry mix, effects returns mix and overall mix outputs. A plurality of audio inputs receive audio signals from various audio sources. First mixing circuitry couples to the plurality of audio inputs to provide a dry audio mix of the audio signals to a dry mix bus. A plurality of sends (or outputs) are also coupled to the plurality of audio inputs to allow external effects processing of the audio signals. A plurality of returns (or inputs) receive the externally processed audio signals. A second mixing circuitry coupled to the plurality of returns mix the externally processed audio signals onto a returns mix bus. Third mixing circuitry couples to the dry mix bus and returns mix bus and mixes the dry audio mix and the returns audio mix to provide a main audio mix on a main audio bus. Outputs are coupled to each bus to provide the dry audio mix, the returns audio mix and the main audio mix as individual output signals. Preferably, each of the dry, return and main mix buses, along with their respective outputs, are stereo, and the first, second and third mixing circuitries include pan circuitry for providing varying audio levels to left and right channels to provide left and right audio mixes for each respective bus.

In the preferred embodiment, a plurality of sends mix buses and sends mixing circuitries are provided. Each sends mix bus couples to one of the plurality of sends. At least one of the audio inputs couple to each of the sends mix buses through the sends mixing circuitry. The sends mixing circuitry is adapted to mix the audio signals onto the various sends mix buses so that each of the sends mix buses provides mixed audio signals at the plurality of sends. Furthermore, the sends mixing circuitry may include level control circuitry associated with each of the plurality of audio inputs coupled to the sends mix buses. The level control circuitry adjusts the level of the audio signals mixed onto the sends mix buses. Thus, each of the sends mix buses may have various mixes comprising varying levels of the original audio signals. Preferably, the level control circuitry includes an electronically controlled variable gain amplifier for each audio signal mixed onto the sends mix buses. A central processor may control the gain of the amplifier.

Equalization circuitry coupled between each of the audio inputs and the first mixing circuitry is used to selectively adjust the characteristics of each audio signal prior to being mixed onto the dry mix bus. Preferably, the equalization circuitry is selectively coupled to the plurality of sends to provide equalization of the audio signals provided to the sends. Switches select the pre- or post-equalized audio signals provided to the sends. Preferably, an internal effects processor couples between the audio inputs and the third mixing circuitry to provide an effects processed audio signal to mix with the returns audio mix on the returns mix bus.

A plurality of preamplifiers are coupled between each of the inputs and the second mixing circuitry and the sends for amplifying the audio signals prior to mixing. A master level control coupled between main mix bus and the main mix output controls the level of the main audio mix output. Similarly, a returns level control coupled between the returns mix bus and the third mixing circuitry controls the level of the returns audio mix to mix with the main audio mix on the main mix bus. These level controls are preferably electronically controlled variable gain amplifiers controlled by the central processor.

Another aspect of the present invention is to provide a method of providing a dry mix, returns mix and overall mix output from a single mixer configuration. The method includes the steps of providing a plurality of audio signals; mixing the audio signals to provide a dry audio mix of the audio signals; sending certain of the audio signals to an output for external processing; receiving externally processed audio signals; mixing the processed audio signals to provide a returns audio mix of the processed signals; and mixing the dry audio mix and the returns audio mix to provide a main audio mix. A main audio mix, a dry audio mix and a returns audio mix are provided as outputs.

Still another aspect of the present invention is to provide a multi-channel audio mixer internally comprising a dry mix bus, an effects mix bus and a main mix bus. The dry mix bus mixes a plurality of audio signals from a respective plurality of audio inputs to provide a dry audio mix. The dry mix bus couples to a dry audio mix output and the main mix bus. The audio inputs couple to external processing outputs. The effects mix bus mixes a plurality of externally processed audio signals provided at an effects return to provide an effects audio mix. The effects audio mix bus couples to an effects audio mix output and also to the main mix bus. The main mix bus mixes the dry audio mix and the effects audio mix from the dry audio mix bus and the effects audio mix bus to provide a main audio mix. The main mix bus couples to a main mix output when the audio signals are sent to the external processing outputs for signal processing outside of the mixer and also mixed without external processing to provide the dry audio mix. The externally processed audio signals are mixed to provide the effects audio mix. Subsequently, the effects audio mix and the dry audio mix are mixed to provide the main audio mix.

These and other aspects of the present invention will become apparent to those skilled in the art after a reading of the following description of the preferred embodiment when considered with the drawings.

DESCRIPTION OF THE PREFERRED EMBODIMENTS

Figure 1:
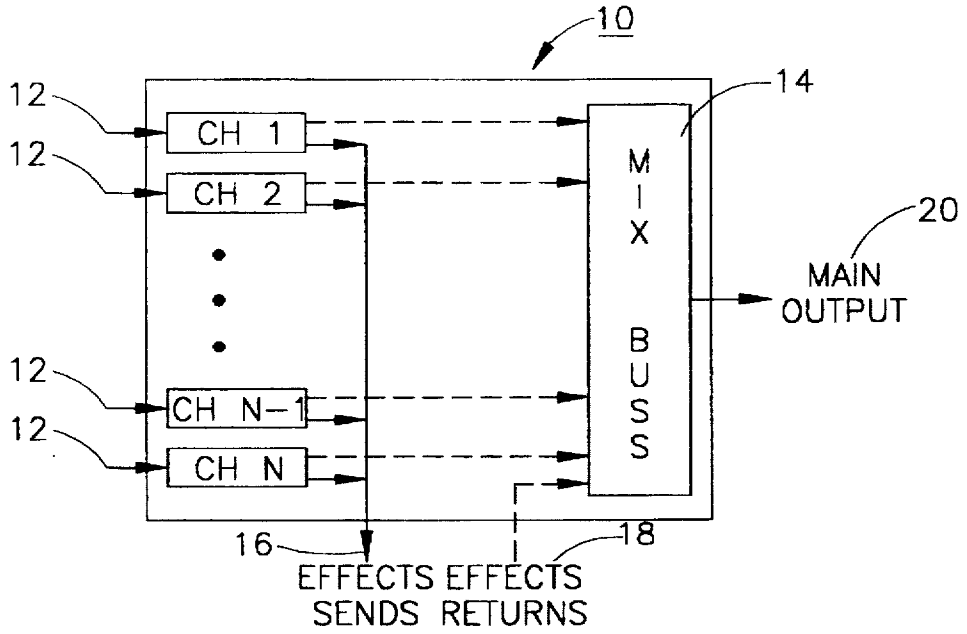
FIG. 1 is a schematic of a basic prior art mixer configuration.

In the following description, like reference characters designate like or corresponding parts throughout the several views. Referring now to the drawings in general, and FIG. 1 in particular, it will be understood that the illustrations are for the purpose of describing a preferred embodiment of the invention and are not intended to limit the invention thereto.

Figure 3:
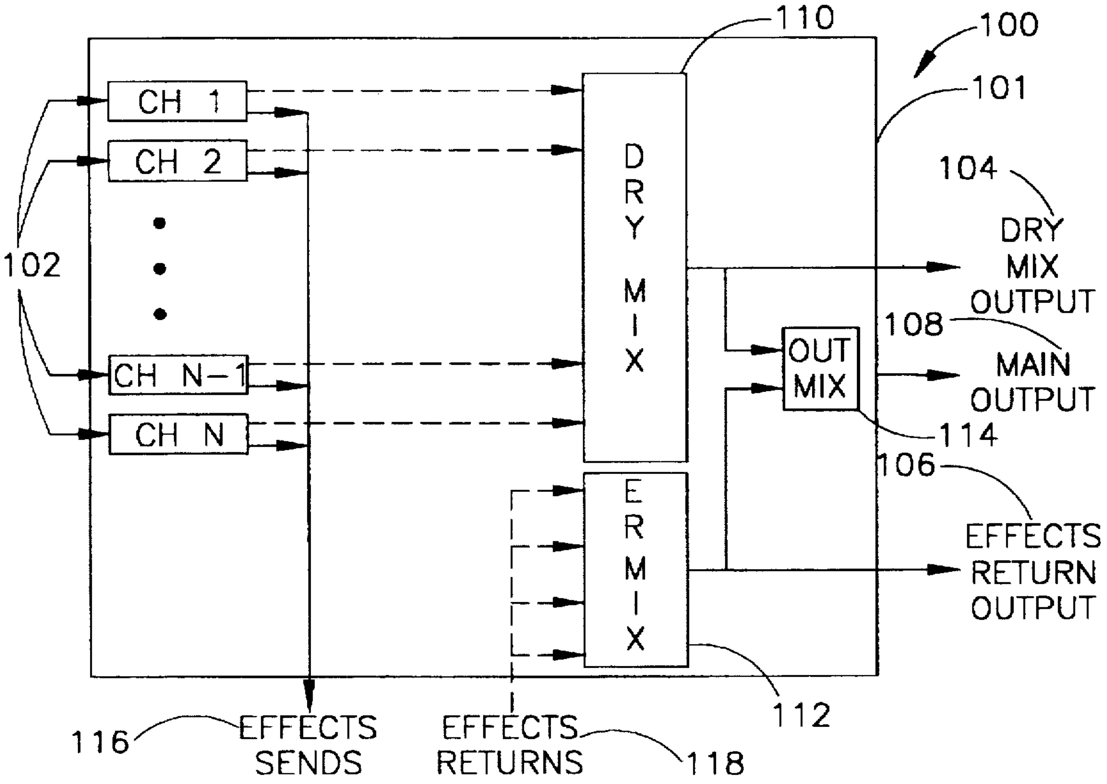
FIG. 3 depicts is a basic schematic of a preferred embodiment constructed according to the present invention.

As best seen in FIG. 3, an integrated audio mixer, generally designated 100, is shown constructed according to the present invention. The audio mixer 100 is provided in a single housing 101 and accepts multiple audio signals through multiple input channels 102 and ultimately provides a "dry" mix output 104, an effects returns mix output 106 and a main mix output 108. The dry mix output 104 provides a dry audio mix signal representing the sum or mix of the individual audio signals placed at the respective input channels 102 without any substantial effects processing. The effects returns mix output 106 provides select or various combinations of select audio signals which have been processed by a special effects processor. Effects processors include devices that create artificial room ambience, reverbs, delays, echoes, pitch changes, harmonies, and flanging (robotic sound) etc. The main mix output provides a main audio mix representing the mix of the dry audio mix and the effects returns audio mix.

The audio mixer 100 provides the dry, effects returns and main audio mix by using, within one integrated mixer, three mixing buses—a dry mixing bus 110, an effects returns mixing bus 112 and a main mixing bus 114. The dry mixing bus 110 receives basically unprocessed audio signals appearing in input channels 102 and mixes them into a dry audio mix. Neither the individual audio signals nor the dry audio mix are processed by an effects processor; however, other signal conditioning measures may be implemented, such as preamplification, feedback elimination, gate compression limiting and equalization. In other words, the dry audio mix is not subjected to an effects processor before or after mixing.

Figure 2:
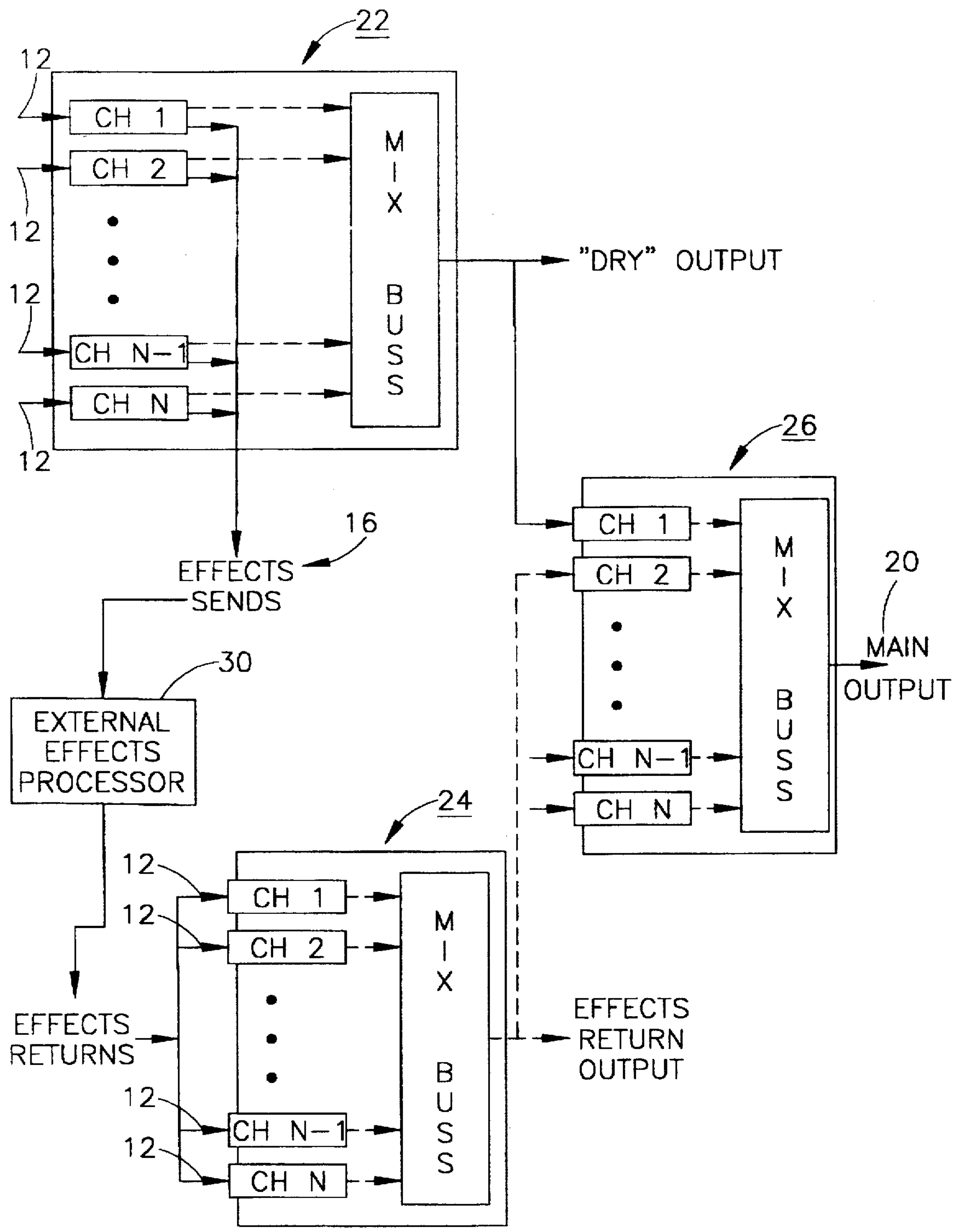
FIG. 2 is a schematic of a mixing system using separate mixers to provide dry, effects returns and main mixed outputs constructed according to the present invention.

The audio signals appearing at the input channels 102 are also routed to one or more effects sends (or outputs) 116. The effects sends 116 are typically connected to an input of an external effects processor 30 (like the one shown in FIG. 2). After the audio signals are processed by the effects processor 30, they are returned to the audio mixer 100 via the effects returns 118.

The effects returns mixing bus 112 receives and mixes the various processed audio signals appearing at the effects returns 118. The effects returns mixing bus 112 provides a mixed, processed audio signal to the effects returns mixed output 106 and to the main mixing bus 114. The main mixing bus 114 mixes the mixed, processed audio signal of the effects returns mixing bus 112 and the mixed, dry audio signal of the dry mixing bus 110 to provide the main audio mix at the main mix output 108.

Figure 4:
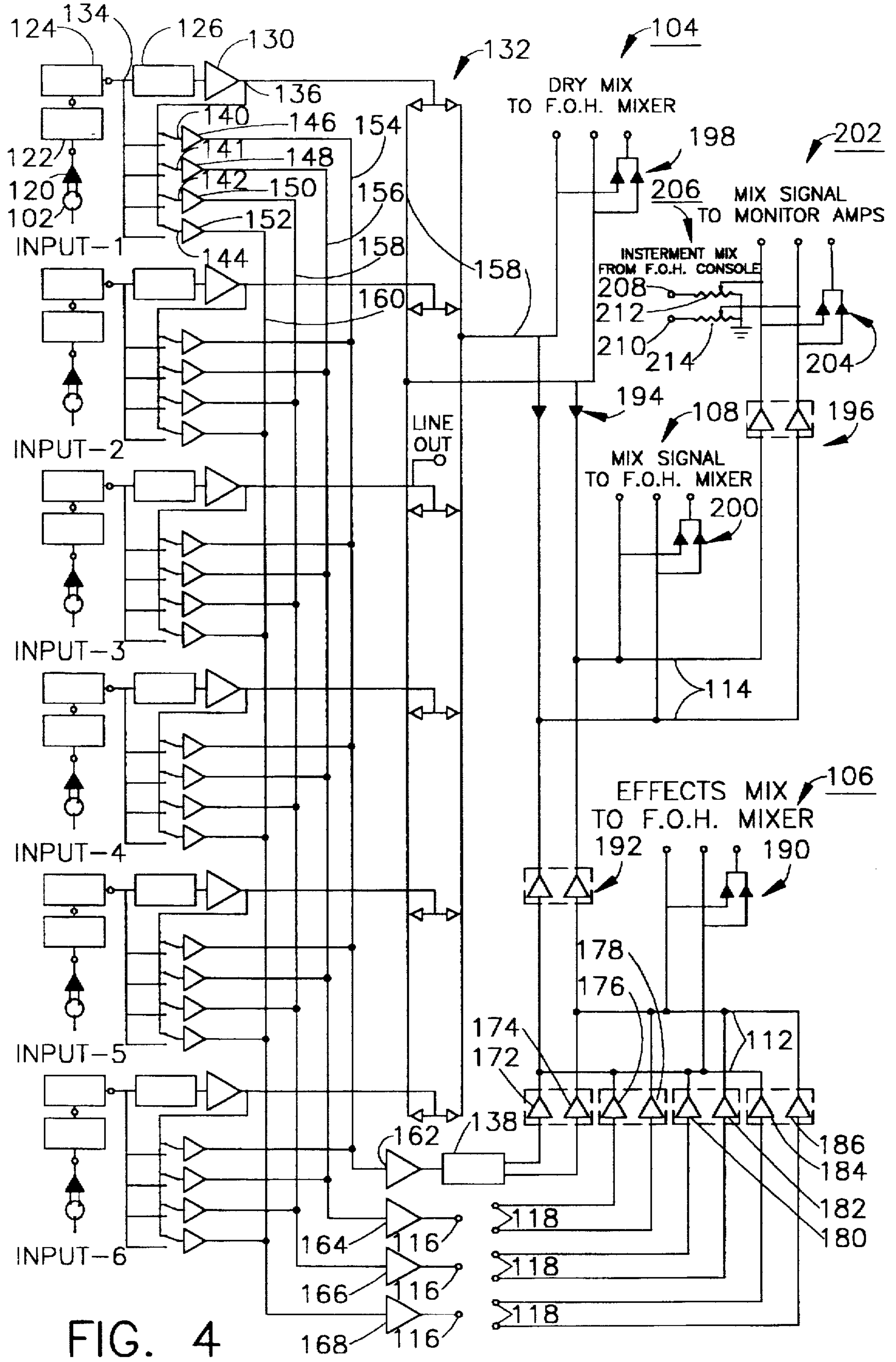
FIG. 4 is a more detailed schematic of the embodiment of FIG. 3.

Turning now to FIG. 4, a more detailed schematic of a preferred embodiment constructed according to the present invention, is shown. Repetitive sections of the mixer lacking reference numerals are identical to the exemplary section being discussed. The mixer embodiment depicted includes six input channels 102, three external effects sends 116 and stereo mixing buses for the dry, effects return and main mixes (110, 112 and 114, respectively). Multiple audio signals are initially applied to the input channels 102. The signal is initially amplified to a desired nominal level for the particular mixer configuration with the preamplifier 120. A feedback eliminator 122 reduces the potential for feedback to enter the system. A gate and compressor/limiter 124 is included for signal typical compression and limiting functions.

An equalizer 126 is used to precondition the total characteristics of the audio signal by increasing or decreasing the level of various frequency ranges or bands throughout the audio frequency spectrum. Preferably, the equalizer 126 is a 4-band, parametric equalizer having high, high-mid, low-mid and low frequency bands. A variable amplifier 130 is used to control the gain of the audio signal for each input. Preferably, the gain for each channel is individually controlled to adjust the level of the audio signals as desired prior to mixing.

At this point, each individual audio signal is sent to the dry mixing bus 110. Panning circuitry 132 is used to deliver the audio signal to the left and right channels of the dry stereo bus. The panning circuitry 132 allows a user to variably control the amount of the audio signal sent to either or both of the stereo channels of the dry mixing bus. For example, certain audio signals are only sent to the left or the right channel while others are sent to both of the channels at varying levels.

The audio mixer 100 is adapted to provide audio signals at selected levels from each of the channel inputs 102 to each of effects sends 116, or, additionally, an internal effects processor 138. If desired, the effects processors can all be contained in the mixer 100, but this configuration is not preferred. They would be inserted between sends 116 and returns 118. The audio signals from each channel appearing at the effects sends 116 are initially selected from either node 130 or 134. The audio signals appearing at node 130 are equalized and amplified as desired by the equalizer 126 and variable amplifier 130. The audio signals appearing at node 134 are not equalized or variably amplified. The latter signal is only preamplified. Switches 140–144 control the selection of the post-equalized signal (node 130) or the pre-equalized signal (node 134). Thus, depending on the position of the switches 140–144, the input audio signal corresponding to each respective input 102 is either selected before equalization at node 134, or selected after equalization at node 130.

When either the post- or pre-equalized audio signals are selected, the signals pass through sends amplifiers 146–152 onto a respective sends bus 154–160. The sends wiring buses 154–160 connect respective sends amplifiers 146–152 associated with each input channel to mix the signal at the output of each sends amplifier 146–152 for each respective channel onto one of the sends mixing buses 154–160. Preferably, the sends amplifiers 146–152 have variable gain controls to control the level of each audio signal mixed onto each respective sends mixing buses 154–160. Thus, each sends mixing bus 154–160 may contain various mixes of varying levels of the individual audio signals for internal or external effects processing. The sends mixing buses 156–160 are each connected to a respective output sends buffer 164–168. Sends mixing bus 154 is connected to an output sends buffer 162 which feeds the internal effects processor 138. The other output sends buffers 164–168 feed the three effects sends 116. The signals appearing at the effects sends 116 are typically sent to external effects processing devices.

The audio signals sent out for external processing return to the audio mixer 100 at the effects returns 118. Preferably, the returning signals are in stereo. The effects returns 118 and the internal effects processor 138 are coupled to return buffers 172–186 wherein the respective left and right channels for each processed signal are mixed onto the effects mixing bus 112. The effects returns mix output 106 is provided from the effects returns bus 112. Preferably, the effects returns mix output 106 provides a left channel output, a right channel output and a mono output derived by bridging the left and right channels with bridging circuitry 190.

The effects returns audio signal mix and the dry audio signal mix are also mixed together to form a main audio mix. The main audio mix is carried on the main mixing bus 114. Buffer amplifiers 194 and buffers associated with the master effects level control 192 provide mixing circuitry for mixing the respective signals of the dry and effects returns mixing buses to form the main audio mix. The respective level of the effects returns mix, mixed with the dry audio signal mix, is variably controlled by the master effects level control 192.

The dry mix output 104 is coupled to the dry mixing bus 110 and provides a left channel, right channel and mono audio output. The mono output is provided by bridging the left and right channels with bridging circuitry 198. Likewise, the main mix output 108 provides a left channel, right channel and mono audio output from the main mixing bus 114. The bridging circuitry 200 sums the left and right channels to provide the mono audio output.

An auxiliary main mix output 202 is also provided. Volume control of the main audio mix is provided by the master level control 196. Additional signals from external equipment, such as another mixing console, may be mixed with the level adjusted main audio mix at the left and right channel auxiliary inputs 208 and 210. Potentiometers 212 and 214 adjust the respective input impedances of the left and right input channels 208 and 210 to control signal levels of auxiliary signals provided at the auxiliary inputs 208 and 210. The auxiliary main mix output 202 also provides left channel, right channel and mono audio outputs. Bridging circuitry 202 sums the left channel and right channel to provide the mono main mix output.

In operation, audio signals are provided to each of the audio inputs 102. Each signal is preamplified (120), equalized (126), further amplified (130) and distributed to the left and right channels of the dry mix bus 110 as desired. Each audio signal, either before or after equalization and further amplification, is mixed with the audio signals from the other inputs at desired levels onto the sends mixing buses 154–160. The mixed input signals are sent along the sends mixing buses 154–160 to internal (138) and external (30) effects processors. After processing, the signals are mixed onto the effects return stereo bus 112 and mixed with the dry audio mix onto the main mixing bus 114. Outputs (104, 106, 202) for each of the dry 110, effects returns 112 and main mixing buses 114 are provided.

Figure 5:
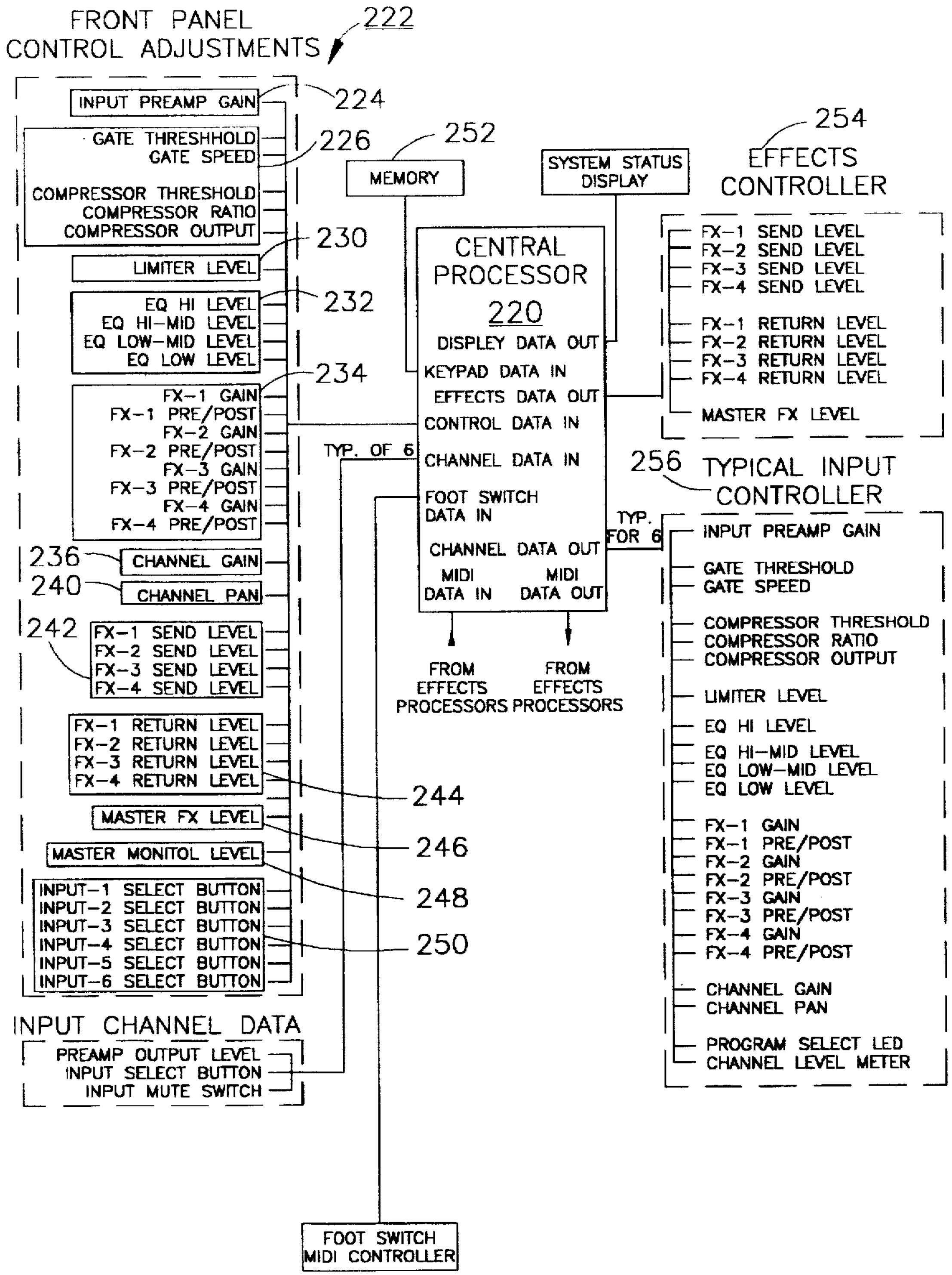
FIG. 5 is a schematic of a central processor and associated control and data lines for controlling the mixer embodiment of FIG. 3.

In the preferred embodiment, a central processor 220, shown in FIG. 5, electronically controls the various buffers and amplifiers to adjust various signal levels within the various sends, dry, effects and main audio mixes. The processor may further control preamplification, equalization and internal effects processing along with any other controllable feature of the mixer and invention disclosed herein.

A front control panel 222 provides a multitude of mixer adjustments to the central processor 220. Adjustments made by operator on the front control panel 222 are carried out by the central processor 220. Functions adjustable by the front control panel 222 include, but are not limited to, controlling the gain of the pre-amp 120 (224), gate compression aspects (226) of the gate compressor limiter 124, the level of the feedback eliminator 122 (230), individual band levels (232) of the parametric equalizer 126, the pre- post equalization switches 140–144, and the gain of amplifiers 146–152 (234). Overall channel gain 236 is provided by controlling the gain of amplifier 130. Adjustments for amplifiers associated with the pan circuitry 132 select the amount of signal appearing on the left and right channels of the dry mix bus 110 (240). The effects sends amplifiers 162–168 also include level adjustment control (242). The effects returns levels are controlled by amplifiers 172–186 (244). The master effects level and master monitor level is controlled from the front panel (246, 248).

In the preferred embodiment, each feature associated with the individual inputs share common adjustments. An operator selects a channel for adjustment by selecting one of the selection buttons 250 and adjusts the various features accordingly. Once the adjustments for any one individual channel are made, the central processor will store the individual channel information in memory 252. Typically, a channel select button 250 is selected for one channel, adjustments are made and stored, a different channel select button is selected and the operator repeats the process as desired. Having common adjustments for multiple channels greatly reduce the number of adjustment controls and overall size and complexity of the audio mixer. Various other inputs are available as shown in FIG. 5.

The central processor 220 provides various outputs according to adjustments made on the front control panel 222. Adjustments made by the operator are turned into control outputs 254, 256 by the central processor 220. These outputs adjust the various levels and switch positions according to adjustments made on the front control panel 222.

Certain modifications and improvements will occur to those skilled in the art upon a reading of the foregoing description. It should be understood that all such modifications and improvements have been deleted herein for the sake of conciseness and readability but are properly within the scope of the following claims.

We claim:

1. An integrated audio mixer providing dry mix, returns mix and overall mix outputs comprising:

a plurality of audio inputs for receiving audio signals;

first mixing circuitry coupled to said plurality of audio inputs for providing a dry audio mix of the audio signals to a dry mix bus;

a plurality of sends coupled to said plurality of audio inputs to output the audio signals for effects processing;

a plurality of returns for receiving effects processed audio signals;

second mixing circuitry coupled to said plurality of returns for providing a returns audio mix of the processed audio signals to a returns mix bus;

third mixing circuitry coupled said dry mix bus and said returns mix bus for providing a main audio mix of the dry audio mix and the returns audio mix to a main audio bus;

a dry mix output coupled to said dry mix bus for providing the dry audio mix as an output;

a returns mix output coupled to said returns mix bus for providing the returns audio mix as an output; and a main mix output coupled to said main mix bus for providing the main audio mix as an output.

2. The apparatus of claim 1 wherein said buses are stereo and said first, second and third mixing circuitries are adapted to provide left and right audio mixes for each respective said stereo dry, return and main mix buses.

3. The apparatus of claim 2 wherein said dry, returns and main mix outputs are stereo and couple to each of respective said stereo buses.

4. The apparatus of claim 2 wherein said first, second and third mixing circuitries include pan circuitry for providing the left and right audio mixes to each respective said stereo bus.

5. The apparatus of claim 1 further comprising a plurality of sends mix buses and a plurality of sends mixing circuitries operatively associated with said send mix buses, each said sends mix bus coupled to one of said plurality of sends, at least one of said plurality of audio inputs coupled to at least one of said sends mix buses through said sends mixing circuitries, said sends mixing circuitries adapted to mix the audio signals from said audio inputs onto said plurality of sends mix buses, wherein each of said sends mix buses provides mixed audio signals at one of the plurality of sends.

6. The apparatus of claim 5 wherein said sends mixing circuitries further include level control circuitries associated with each of said plurality of audio inputs coupled to each said sends mix bus, said level control circuitries adapted to adjust a level of the audio signals mixed onto said sends mix buses.

7. The apparatus of claim 6 wherein said level control circuitry includes an electronically controlled variable gain amplifier for each of the audio signals mixed onto said sends mix buses.

8. The apparatus of claim 1 further comprising equalization circuitry coupled between each of said plurality of audio inputs and said first mixing circuitry to selectively adjust tonal characteristics of the audio signals.

9. The apparatus of claim 8 wherein said equalization circuitry is further coupled between said plurality of inputs and said plurality of sends to selectively adjust tonal characteristics of the audio signals provided to said plurality of sends.

10. The apparatus of claim 9 further including a plurality of switches coupled to said plurality of sends and selectively coupled to said plurality of audio inputs prior to said equalization circuitry and after said equalization circuitry.

11. The apparatus of claim 1 further including an internal signal processor coupled between said plurality of audio inputs and said third mixing circuitry to provide a processed audio signal to mix with the returns audio mix on said returns mix bus.

12. The apparatus of claim 1 further including a plurality of preamplifiers coupled between each said plurality of inputs and said second mixing circuitry and plurality of sends for amplifying the audio signals prior to mixing.

13. The apparatus of claim 1 further comprising a master level control coupled between said main mix bus and said main mix output for controlling a level of the main audio mix.

14. The apparatus of claim 13 wherein said master level control includes an electronically controlled variable gain amplifier.

15. The apparatus of claim 1 further comprising a returns level control coupled between said returns mix bus and said third mixing circuitry for controlling a level of the returns audio mix to mix with the main audio mix on said main mix bus.

16. The apparatus of claim 15 wherein said effects level control includes an electronically controlled variable gain amplifier.

17. An integrated audio mixer providing dry mix, returns mix and overall mix outputs comprising:

- a plurality of audio inputs for receiving a plurality of audio signals;
- first mixing circuitry and pan circuitry coupled to said plurality of audio inputs for providing a stereo dry audio mix of the audio signals to a left and right channels of a dry mix bus;
- a plurality of sends coupled to said plurality of audio inputs to output the audio signals for external processing;
- a plurality of stereo returns for receiving stereo processed audio signals;
- second mixing circuitry coupled to said plurality of returns for providing a stereo returns audio mix of the stereo processed audio signals to left and right channels of a stereo returns mix bus;
- third mixing circuitry coupled said dry mix bus and said returns mix bus for providing a stereo main audio mix of the dry audio mix and the returns audio mix to left and right channels of a stereo main audio bus;
- a dry mix output coupled to said stereo dry mix bus for providing the stereo dry audio mix as an output;
- a returns mix output coupled to said returns mix bus for providing the stereo returns audio mix as an output; and
- a main mix output coupled to said main mix bus for providing the stereo main audio mix as an output.

18. The apparatus of claim 17 further comprising a plurality of sends mix buses and a plurality of sends mixing circuitries operatively associated with said send mix buses, each said sends mix bus coupled to one of said plurality of sends, at least one of said plurality of audio inputs coupled to at least one of said sends mix buses through said sends mixing circuitries, said sends mixing circuitries adapted to mix the audio signals from said audio inputs onto said plurality of sends mix buses, wherein each of said sends mix buses provides mixed audio signals at one of the plurality of sends.

19. The apparatus of claim 17 further comprising a plurality of sends mixing circuitries and wherein each of said plurality of sends are coupled to each of said plurality of audio inputs through said sends mixing circuitries, said sends mixing circuitries adapted to receive and mix one or more of the audio signals from said audio inputs onto a plurality of sends mix buses and, said sends mix buses provide mixed audio signals to said plurality of sends.

20. The apparatus of claim 19 wherein said sends mixing circuitries further include level control circuitries associated with each of said plurality of audio inputs coupled to each said sends mix bus, said level control circuitries adapted to adjust a level of the audio signals mixed onto said sends mix buses.

21. A method of providing a dry mix, returns mix and overall mix outputs from a single mixer configuration comprising:

- providing a plurality of audio signals;
- mixing the audio signals to provide a dry audio mix of the audio signals;
- sending certain of the audio signals to an output for external processing;
- receiving externally processed audio signals;
- mixing the processed audio signals to provide a returns audio mix of the processed audio signals;
- mixing the dry audio mix and the returns audio mix to provide a main audio mix;
- outputting the main audio mix;
- outputting the dry audio mix; and
- outputting the returns audio mix;
- wherein each mixing step and providing step are performed in a single mixer configuration.

22. A multichannel audio mixer comprising a housing containing a dry mix bus, an effects mix bus and a main mix bus, said dry mix bus adapted to mix a plurality of audio signals from a respective plurality of audio inputs to provide a dry audio mix, said dry mix bus coupled to a dry audio mix output and said main mix bus, said audio inputs coupled to external processing outputs, said effects mix bus adapted to mix a plurality of externally processed audio signals provided at an effects return to provide an effects audio mix, said effects mix bus coupled to an effects audio mix output and said main mix bus, said main mix bus adapted to mix the dry audio mix and the effects audio mix from the dry audio mix bus and the effects audio mix bus to provide a main audio mix, said main mix bus coupled to a main mix output, wherein the audio signals are sent to said external processing outputs for signal processing outside of said mixer and also mixed without external processing to provide the dry audio mix, the externally processed audio signals mixed to provide the effects audio mix, the effects audio mix and the dry audio mix are mixed to provide the main audio mix.

23. The apparatus of claim 22 wherein said buses are stereo and have left and right channels, said mixer further including panning circuitry adapted to provide a left and right signal for each of the audio signals, said dry mix bus mixing the left and right channels corresponding to each said audio signal to form the dry audio mix on the dry mix bus.

24. The apparatus of claim 22 further comprising a master level control coupled between said main mix bus and said main mix output for controlling a signal level of the main audio mix.

25. The apparatus of claim 22 further comprising a plurality of sends mix buses and sends mixing circuitries, each said sends mix bus coupled to one of said plurality of external processing outputs, at least one of said plurality of audio inputs coupled to each said sends mix bus through said sends mixing circuitries, said sends mixing circuitries adapted to mix the audio signals onto said plurality of sends mix buses, wherein each of said sends mix buses provides mixed audio signals at one of said plurality of sends.

26. The apparatus of claim 25 wherein said sends mixing circuitries further include level control circuitries associated with each of said plurality of audio inputs coupled to each said sends mix bus, said level control circuitries adapted to adjust a level of the audio signals mixed onto said sends mix buses.

* * * * *